United States Patent [19]

De Freze

[11] 4,138,046
[45] Feb. 6, 1979

[54] DEMOUNTABLE TRUCK BED LOAD-SUPPORTING RACK

[76] Inventor: William E. De Freze, 7530 Ironwood Dr., Dublin, Calif. 94566

[21] Appl. No.: 759,137

[22] Filed: Jan. 13, 1977

Related U.S. Application Data

[63] Continuation-in-part of Ser. No. 565,274, Apr. 4, 1975, abandoned.

[51] Int. Cl.² ............................................. B60R 9/06
[52] U.S. Cl. ...................... 224/42.42 R; 211/60 R; 211/182; 211/204; 296/3; 296/43
[58] Field of Search ............ 224/29 R, 42.01, 42.1 E, 224/42.42 R; 296/3, 10, 23 MC, 43; 211/60 R, 182, 189, 190, 191, 195, 204, 206

[56] References Cited

U.S. PATENT DOCUMENTS

| 846,877 | 3/1907 | Topliff | 296/43 X |
| 991,736 | 5/1911 | Minnick | 211/60 R X |
| 1,393,054 | 10/1921 | Turner | 296/3 X |
| 2,043,036 | 6/1936 | Duncan | 211/182 |
| 2,570,802 | 10/1951 | Hatteburg | 296/3 X |
| 3,217,449 | 11/1965 | Levere | 224/42.1 E X |
| 3,677,562 | 7/1972 | Bronstein | 296/43 X |
| 3,946,876 | 3/1976 | Jay | 211/60 R |

FOREIGN PATENT DOCUMENTS

| 1038471 | 9/1953 | France | 211/204 |
| 906725 | 9/1962 | United Kingdom | 211/189 |

Primary Examiner—Trygve M. Blix
Assistant Examiner—Winston H. Douglas
Attorney, Agent, or Firm—Warren, Chickering & Grunewald

[57] ABSTRACT

A load-supporting rack for a truck bed including a plurality of similar base members adapted for mounting adjacent the fore and aft corners of a truck bed and each having a vertically elongated opening extending to the upper end thereof; a plurality of similar elongated vertical members interchangeably mounted in the base members; and a plurality of similar horizontal members interchangeably mounted on the vertical members; the parts when disassembled providing compact stowage in a bundle of essentially elongated elements.

3 Claims, 10 Drawing Figures

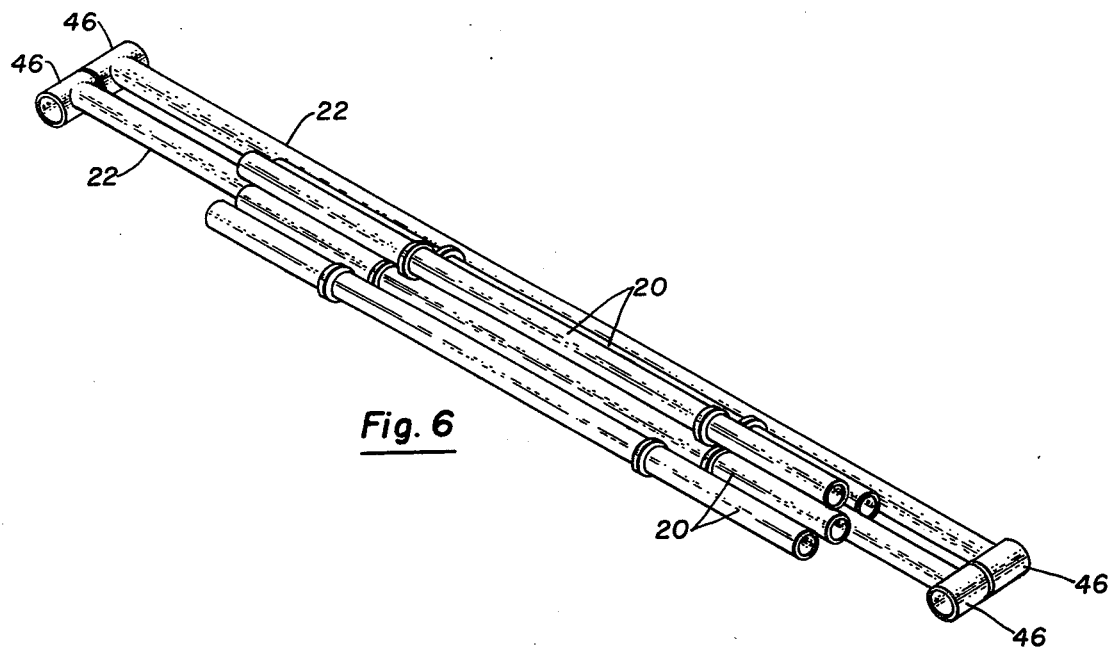
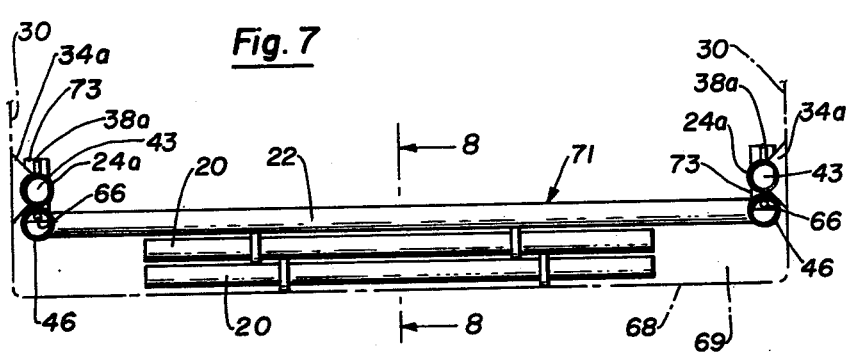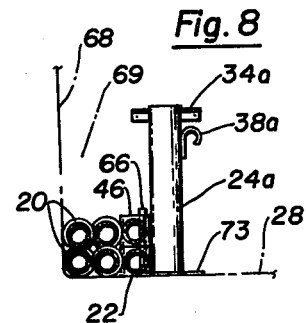
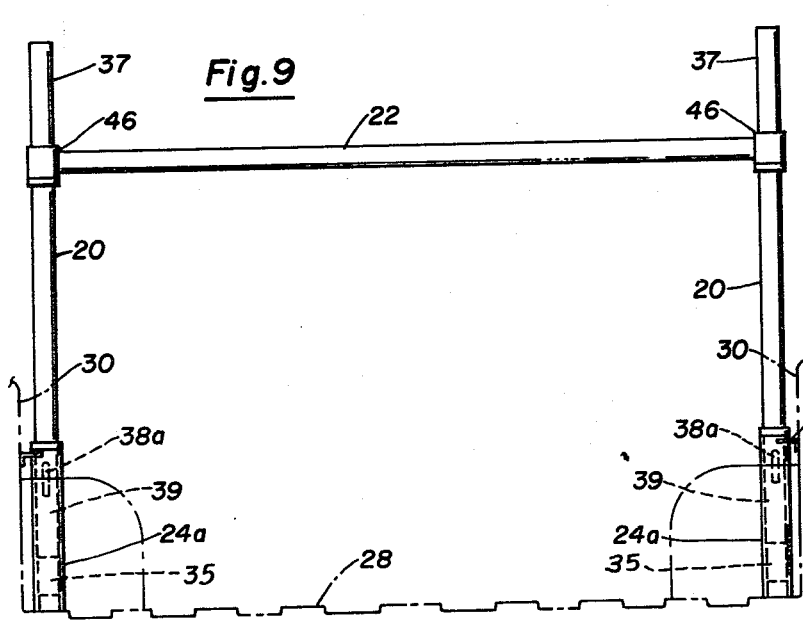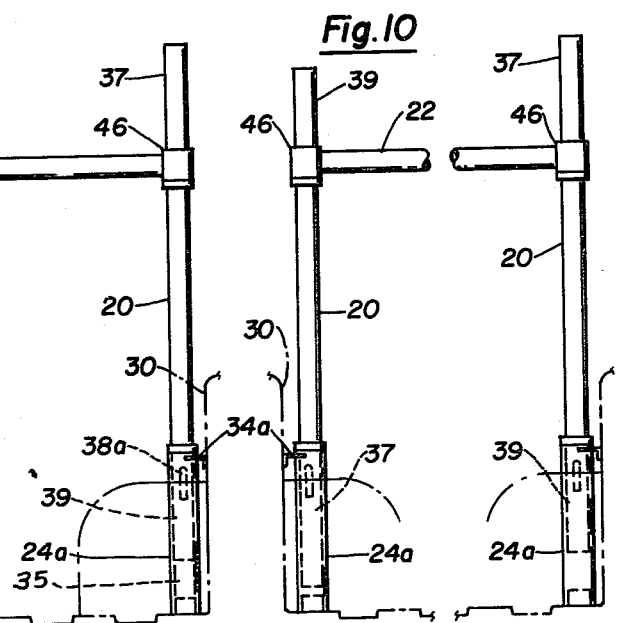

DEMOUNTABLE TRUCK BED LOAD-SUPPORTING RACK

BACKGROUND OF THE INVENTION

Field of Invention

The invention relates to load-supporting racks for truck beds and particularly designed for use with pick-up-type trucks, the present application being a continuation-in-part of my Application Ser. No. 565,274, filed Apr. 4, 1975, abandoned.

Description of Prior Art

Racks or carriers of the type to which the present invention pertains are usually composed of rigidly connected members forming a frame over the truck bed particularly designed to support elongated members, such as ladders, lumber and the like, lengthwise of the bed and, in most instances, over the top of the truck cab. Such racks basically become a fixture of the truck and are not conveniently or immediately removable.

SUMMARY OF INVENTION

The rack of the present invention comprises a plurality of simple elongated members which may be quickly and readily interconnected and assembled into a strong load-bearing rack on a truck bed, and may be disassembled with equal facility, and when disassembled, provide a bundle of essentially elongated elements for compact stowage.

As another feature of the present rack, certain of the members have optional mounting positions affording optional load-carrying configurations for the rack.

A further object of the present invention is to provide a demountable load-supporting rack of the character described which is readily adaptable to a variety in styles of pickup trucks, such as the stylish rancher-type pickup of current popularity, as well as conventional pickups and utility trucks.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 6 is a perspective view of the rack parts as they may be stowed in a neat bundle of essentially elongated elements.

FIG. 7 is a plan view of a rack having a modified form of base members and with the demountable parts of the rack disassembled and stowed at the forward end of the truck bed.

FIG. 8 is a cross-sectional view taken substantially on the plane of line 8—8 of FIG. 7.

FIGS. 9 and 10 are side elevations showing optional positioning of certain of the rack members.

DETAILED DESCRIPTION OF THE INVENTION

Figure 1:
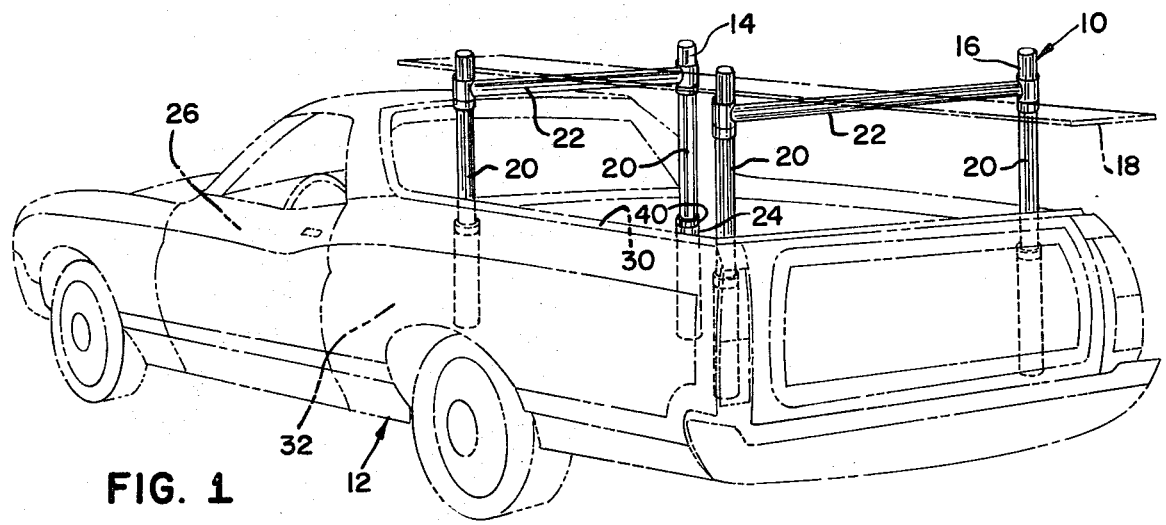
FIG. 1 is a perspective view of a demountable truck bed load-supporting rack constructed in accordance with the present invention.

Referring now to FIG. 1, a perspective view of the rack, designated generally by the reference numeral 10, is shown installed on a rancher-type pickup truck 12. The installed rack 10 is comprised of a front H-frame 14 and a rear H-frame 16, which together provide an elevated carrier for transportiong items such as lumber 18, shown in FIG. 1 for illustrative purposes.

Figures 2, 3:
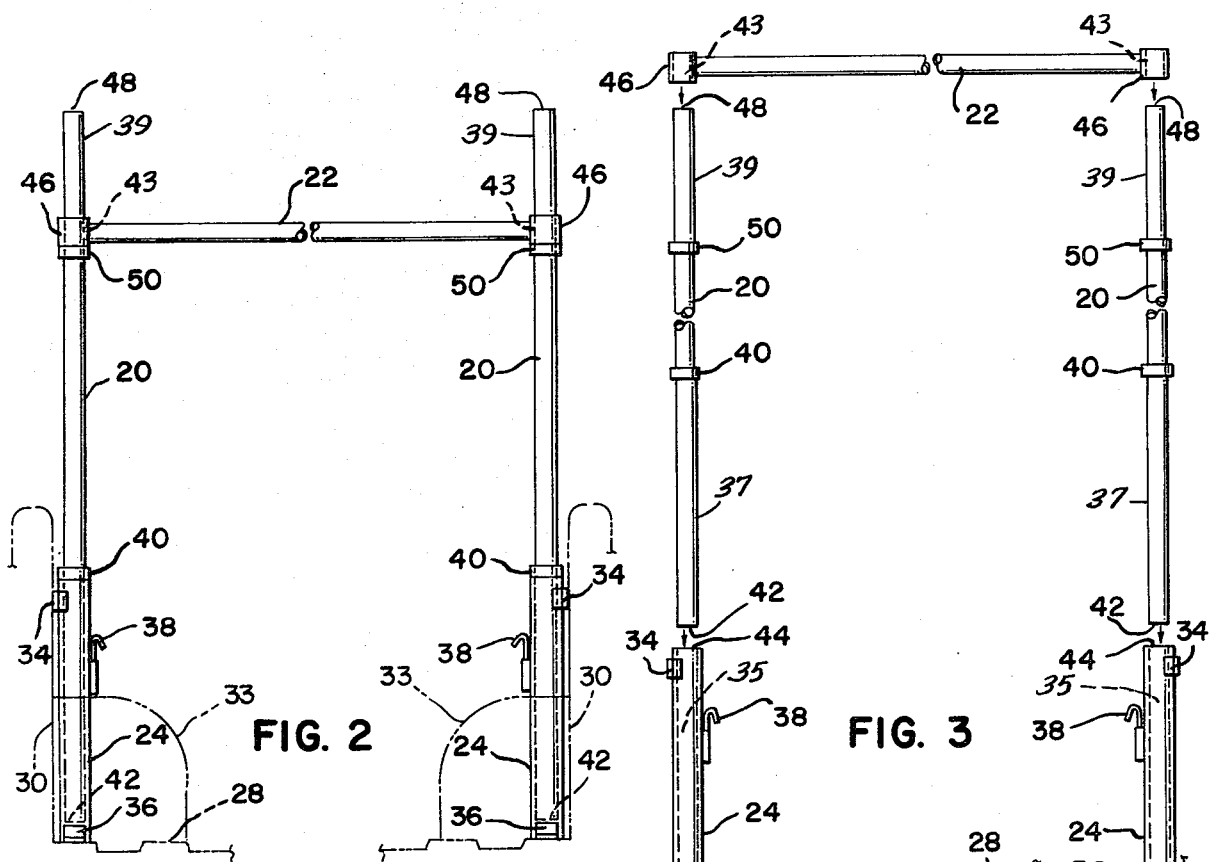
FIG. 2 is a front elevation of one of the end frames forming part of the rack.
FIG. 3 is an exploded front elevation similar to FIG. 2, but showing the several parts in detached position.

With reference to FIGS. 2 and 3, each H-frame is similarly constructed with a pair of similar elongated, vertical leg members 20, a horizontal cross-member 22 interconnecting the two leg members 20, and two similar base members serving as receiver casings 24. As shown in the exploded view of FIG. 3, these principal elements are separable from one another in order that each of the two H-frames can be disassembled for convenient, compact stowage as a bundle of essentially elongated elements, as seen in FIGS. 6, 9 and 10. While the two H-frames comprising the rack may be identical, in certain installations, such as the rancher-type pickup shown in FIG. 1, they may be of different height. This is accomplished by shortening the effective length of one pair of vertical members, such as the rear H-frame 16 in FIG. 1. In this manner, a low profile can be maintained for the stylish rancher-type pickup truck. Preferably, however, and as here shown, the assembly of the rack is facilitated when all of the members 20 are of identical form and all of the base members 24 are of identical form so that the vertical members may be interchangeably mounted in any of the base members. Similarly, and as a feature of the present invention, the horizontal members 22 are of identical form so that they, too, are interchangeably mounted on the vertical members. Accordingly, no matching up of horizontal and vertical members is required.

The rancher-type truck 12 has a cab area 26 and a rear bed 28 with side walls 30. However, in the rancher-type truck 12, the side walls 30 are formed with contoured outside side panels 32 which are unsuitable for direct support of the H-frames. Therefore, the H-frames are installed on the truck 12 against the side walls 30 within the bed 28. Installation is accomplished by mounting the two pairs of base members 24 adjacent the fore and aft corners of the bed on opposite sides of and spaced from the usual wheel wells 33.

Figure 4:
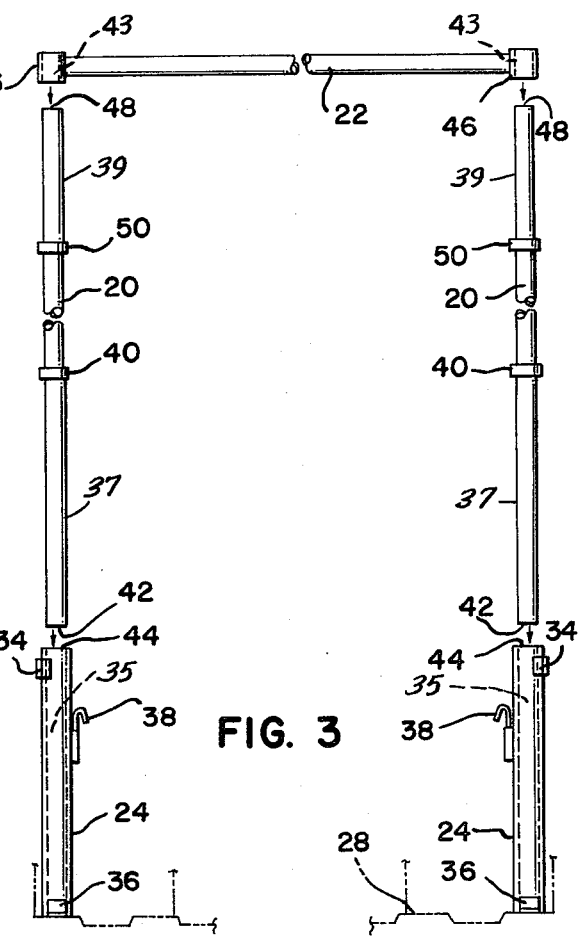
FIG. 4 is a side elevational view of one of the base-supporting members of the rack.

As shown in FIGS. 2, 3 and 4, each base member 24 includes a pair of brackets 34 below the top of the casing for fastening the casing with conventional fasteners (not shown), such as metal screws or bolts. The base members here include an additional bracket 36 at the base of the casing which is secured to the bed 28 of the truck 12 in a similar manner. The brackets are secured to the casing by welds. Each casing is further provided with a tie hook 38 for convenient lashing of articles to the assembled rack, which, in turn, ties everything integrally together.

The several base members 24 are each formed with a vertical elongated opening 35 extending to the upper end 44 for telescopically receiving an end 37 of any one of the vertical members 20 which is provided with stop means, here in the form of an annular collar 40 surrounding and fixed to member 20, engageable with upper end 44 of the base member to provide load-bearing support therefor, preferably with the normally lower end 42 spaced from the truck bed 28. As a feature of the present invention, the opposite ends 39 of the vertical members are of cylindrical form so as to facilitate the attachment of the horizontal members 22 without any problem of angularity alignment, and the latter are each composed of a single elongated member provided with vertical openings 43 slidably mounted on ends 39 of transversely positioned fore and aft members, as illustrated in FIGS. 2 and 3. The vertical members have a second stop means 50 thereon, spaced from the normally top ends 48 for engaging the horizontal members 22 and providing load-bearing support therefor. Stop means 50 may comprise, as in the case of stop means 40, an annular collar surrounding and affixed to vertical member 20. It will thus be seen that both the vertical members 20 and the horizontal members 22 are composed essentially of single elongated members which will stack compactly when disassembled in the manner depicted in FIGS. 6, 7 and 8.

Preferably, and as here shown, openings 43 are here provided by sleeves 46 fixed, as by welding, to the opposite ends of each of the horizontal members. As here shown, sleeves 46 have a length somewhat greater than the transverse dimension or diameter of the horizontal members 22 to which they are affixed.

By fashioning both end portions 37 and 39 of the vertical members 20 of identical cylindrical form, optional load-carrying configurations for the rack may be readily obtained by simply inverting one or more of the vertical members, as illustrated in FIGS. 9 and 10. To implement this feature, the distance between stop means 50 and end 48, with respect to each of the vertical members, is made somewhat smaller than the distance between stop means 40 and end 42. At the same time, the length of openings 35 in base members 24 is at least as great as the length between collar 40 and end 42 and substantially greater than the length of the openings 43 through sleeves 46. Accordingly, when vertical member 20 is positioned with its end portion 37 in base member 24 and its end portion 39 uppermost, as seen in FIGS. 2 and 3, there will be a minimum projection of end portion 39 above horizontal member 22. Alternatively, when vertical member 20 is inverted, as seen in FIGS. 9 and 10, with its end portion 39 mounted in base member 24a, end portions 37 (now uppermost) will extend a somewhat greater distance above horizontal member 22 for carrying a somewhat higher load on the rack. One or more of the vertical members may be so inverted. In FIG. 9 two transversely related vertical members are inverted to provide the high load-carrying support on both the normally left- and right-hand sides of the rack. In FIG. 10 only member 20 at the right-hand side of the rack is inverted, thus providing a combination of a high load-carrying profile on the right side and a normal, lower load-carrying profile on the left. Simple commercially available tubing may be advantageously used to construct the vertical and horizontal members of similar form at minimum cost and weight. Due to the identical fixed spacing between stops 40 and 50 on all of the vertical members, horizontal members 20 will always be supported horizontally in all of the optional inverted positions of the various vertical members.

Figure 5:
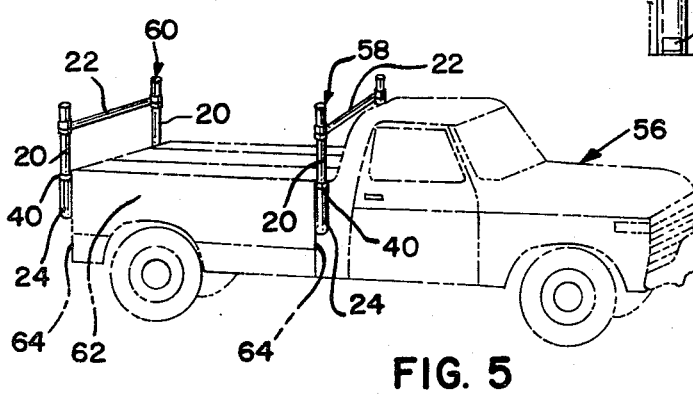
FIG. 5 is a perspective view of a modified form of the rack as adapted to a utility-type truck.

The rack of the present invention may be readily installed on various types of trucks other than the rancher-type pickup truck illustrated in FIG. 2. For example, the base members 24 may be secured externally of the truck body in the case of a utility body-type truck, as illustrated in FIG. 5. Referring to FIG. 5, a utility-type pickup 56 is shown with a front H-frame 58 and a rear H-frame 60 mounted on fore and aft ends of utility compartments 62 at the rear of the pickup. As shown, the base members 24 are fastened directly to the outside walls 64 of the utility compartment, preferably by bolts (not shown). In the same manner as described hereinbefore, the vertical leg members 20 are supported in the base members 24 by the collars 40 attached to the leg members. Joining the two spatially positioned pairs of leg members at the fore and aft ends of the utility compartment are the two cross-members 22 having end sleeves 46 similarly supported on collars 50 fixed to the leg members 20.

A modified form of base member 24a is illustrated in FIGS. 7-10, wherein guide pins 66 are connected to a pair of base members 24a mounted at the forward end of the truck bed 28 adjacent to but spaced from the cab wall to define a compartment therebetween, pins 66 being mounted one adjacent each pair of base members 24a in compartment 69 and extending vertically therein and spaced transversely for telescopically receiving sleeves 46 on horizontal members 22 for stacking the latter on pins 66, see FIGS. 9 and 10, to define a rear wall 71 for compartment 69; and vertical members 20 will normally have a length and dimension for positioning lengthwise in compartment 69 to be retained between walls 68 and 71 in a most compact and out-of-the-way stowage of the members when not in use.

The length of vertical members 20 will normally be selected to elevate the load carried by the cross-members 22 somewhat above the top of the cab 26. In most instances the required length of members 20 will be substantially less than the length of the horizontal members 22, which will normally span the width of the truck bed, and thus the vertical members 20 will normally stow length-wise within compartment 69, as illustrated in FIGS. 9 and 10. Moreover, in the rancher-style truck, as depicted in FIG. 1 with wheel wells 33, the base members 24 are mounted in front of and behind the wheel wells, and below the side walls of the bed so as to in no way interfere with the installation of a camper body, which will normally be mounted on the bed between wheel wells 33.

Base members 24 are each here fitted with a top bracket 34a for fastening to the truck bed side wall 30 and with a base plate 73, which extends laterally from the bottom of member 24a for fastening to the truck bed bottom 28 and for anchoring the lower end of pin 66. Also, in this embodiment tie-down hooks 38a are positioned on the aft side of members 24a for most convenient use.

What is claimed is:

1. A load-supporting rack for a truck bed comprising:
  a plurality of similar base members attached for mounting adjacent the fore and aft corners of a truck bed and each having a vertically elongated cylindrical opening extending to the upper end thereof;
  a plurality of similar elongated cylindrical tubular members dimensioned for slidable mounting in upright position, one on each of said openings;

a pair of collars fixed in similarly longitudinally spaced relation on and surrounding each of said upright members, one of said collars being spaced from one end of each of said upright members and engageable with one of said base members to provide load-bearing support for said upright members, the other of said collars being similarly spaced from the opposite end of each of said upright members;

a plurality of similar individually separate cylindrical tubular horizontal members;

parallel sleeves afixed to the opposite ends of each of said horizontal members and providing parallel cylindrical openings dimensioned for slidably receiving said other ends of a transversely related pair of upright members, said sleeves being dimensioned to bear on the other of said collars with the latter providing load-bearing support therefor; and said upright and horizontal members when disassembled providing compact stowage in a bundle of essentially elongated elements with all of said members disposed in substantially parallel relations.

2. A rack as defined in claim 1 adapted for mounting on a truck having a cab and a cab wall forwardly of said bed;

guide pins connected to a pair of said base members adapted for mounting at the forward end of said truck bed adjacent to but spaced from said wall to define a compartment therebetween, said pins being mounted one adjacent each of said pair of base members in said compartment and extending vertically therein and spaced transversely for telescopically receiving said sleeves for stacking of said horizontal members on said pins to define a rear wall for said compartment; and said vertical members having a length and being dimensioned for positioning lengthwise in said compartment between said walls.

3. A rack as defined in claim 1, the opposite ends of said upright members being dimensioned to provide interchangeable mounting of said upright members in said base members and optional inverted mounting of said upright members in said base members;

said sleeve openings being dimensioned to provide interchangeable mounting on said upright members and on both ends thereof; and said collars being spaced by different distances from the opposite ends of said upright members and said base member openings having a length at least as great as the greatest distance between either of said collars and its adjacent member end to provide in the optional inverted positioning of said upright members an alternate positioning of said horizontal members relative to the upper ends of said upright members.

* * * * *